(12) United States Patent
Daniel et al.

(10) Patent No.: US 9,683,845 B2
(45) Date of Patent: Jun. 20, 2017

(54) VIRTUAL GYROSCOPE USING DUAL MAGNETOMETERS FOR ELECTRONIC DEVICES

(71) Applicant: Intel Corporation, Santa Clara, CA (US)

(72) Inventors: Kevin J. Daniel, Tigard, OR (US); Xianfeng Ding, Santa Clara, CA (US); Kenneth P. Foust, Beaverton, OR (US); Eduardo X. Alban, Hillsboro, OR (US); Rodolfo E. Camacho-Aguilera, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 14/497,945

(22) Filed: Sep. 26, 2014

(65) Prior Publication Data

US 2016/0091313 A1    Mar. 31, 2016

(51) Int. Cl.
| | | |
|---|---|---|
| *G01R 33/02* | (2006.01) | |
| *G01C 19/60* | (2006.01) | |
| *G01C 17/38* | (2006.01) | |
| *G01C 19/00* | (2013.01) | |
| *G01C 25/00* | (2006.01) | |

(52) U.S. Cl.
CPC ............. *G01C 19/60* (2013.01); *G01C 17/38* (2013.01); *G01C 19/00* (2013.01); *G01C 25/005* (2013.01)

(58) Field of Classification Search
CPC ........ G01C 17/38; G01C 19/00; G01C 19/60; G01C 25/005
USPC ....................................... 324/244
See application file for complete search history.

(56) References Cited

U.S. PATENT DOCUMENTS

| | | | | |
|---|---|---|---|---|
| 3,899,834 A | * | 8/1975 | Harrison, Jr. ............ | G01C 9/00 33/352 |
| 5,585,726 A | * | 12/1996 | Chau ....................... | G01V 3/26 175/45 |
| 6,636,826 B1 | | 10/2003 | Abe et al. | |
| 6,653,831 B2 | | 11/2003 | Friend et al. | |
| 7,637,024 B2 | | 12/2009 | Amundson et al. | |
| 8,880,373 B2 | | 11/2014 | Kulik et al. | |

(Continued)

FOREIGN PATENT DOCUMENTS

| | | |
|---|---|---|
| CN | 101477181 B | 3/2011 |
| TW | 201139986 A | 11/2011 |
| TW | 201411096 A | 3/2014 |

OTHER PUBLICATIONS

Office Action and Search Report received for Taiwanese Patent Application No. 104127521, mailed on Aug. 16, 2016, 17 pages including 9 pages of English translation.

(Continued)

*Primary Examiner* — Jay Patidar
(74) *Attorney, Agent, or Firm* — Alpine Technology Law Group LLC

(57) ABSTRACT

A magnetometer unit which may be incorporated in an electronic device receives first magnetic response data from a first magnetic sensor and second magnetic response data from a second magnetic sensor displaced from the first magnetic sensor. The magnetometer unit generates a composite response surface representation from the first magnetic response data and the second magnetic response data, and stores the composite response surface representation in a non-transitory memory.

8 Claims, 11 Drawing Sheets

(56) References Cited

U.S. PATENT DOCUMENTS

| | | | |
|---|---|---|---|
| 8,928,309 B2* | 1/2015 | Oliver | G01R 33/0035 |
| | | | 324/202 |
| 2003/0134665 A1 | 7/2003 | Kato et al. | |
| 2006/0156564 A1 | 7/2006 | Kwon et al. | |
| 2008/0066331 A1 | 3/2008 | Brzezinski et al. | |
| 2010/0121599 A1 | 5/2010 | Boeve et al. | |
| 2012/0245875 A1 | 9/2012 | Del Castillo et al. | |
| 2013/0179110 A1* | 7/2013 | Lee | A61B 5/1118 |
| | | | 702/130 |
| 2015/0177020 A1 | 6/2015 | An et al. | |

OTHER PUBLICATIONS

International Search Report and Written Opinion received for International Patent Application No. PCT/US2015/047072, mailed on Nov. 4, 2015.

International Preliminary Report on Patentability received for International Application No. PCT/US2015/047072, mailed on Apr. 6, 2017, 9 pages.

* cited by examiner

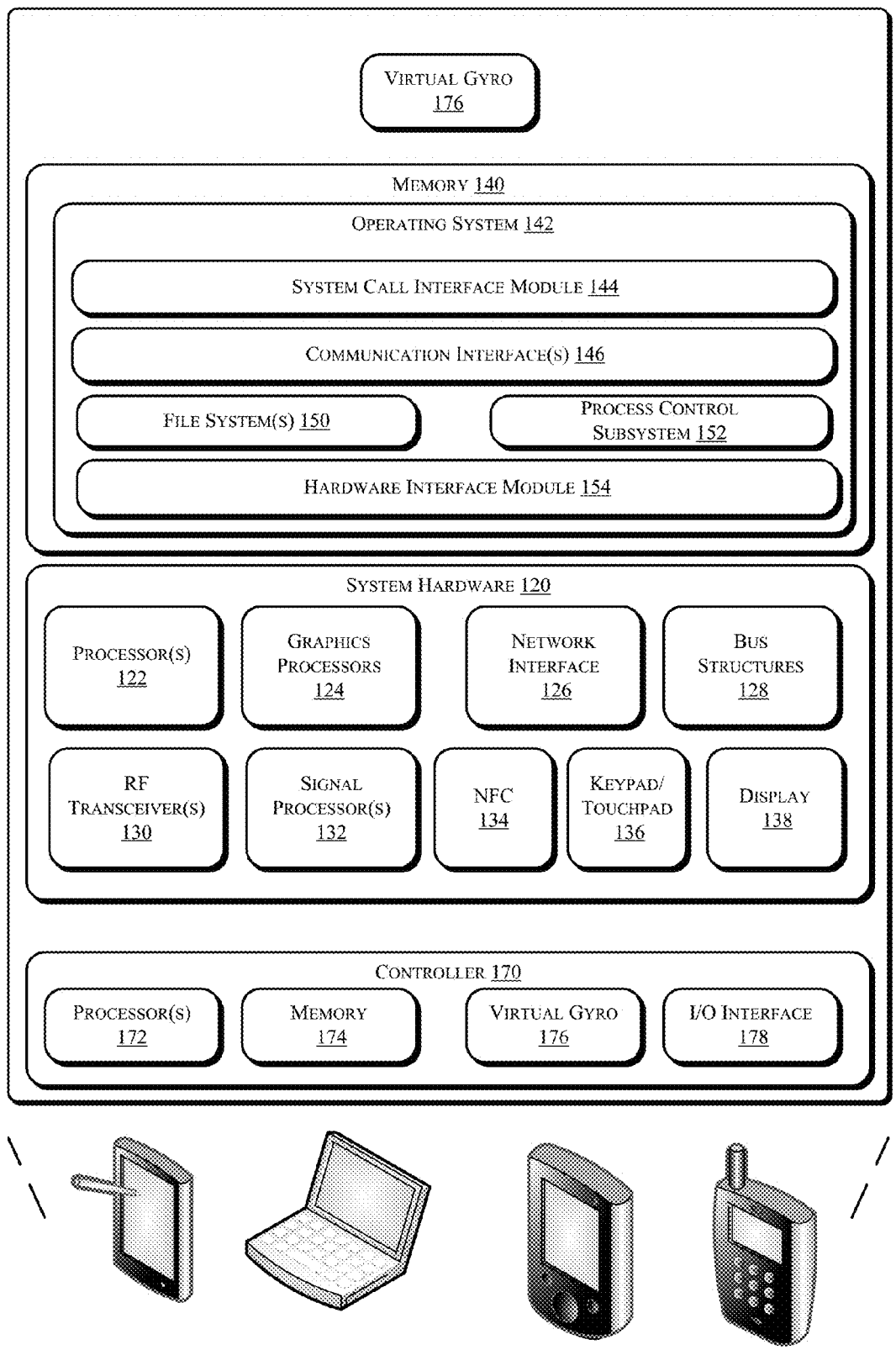
FIG. 1  Electronic Device 100

176

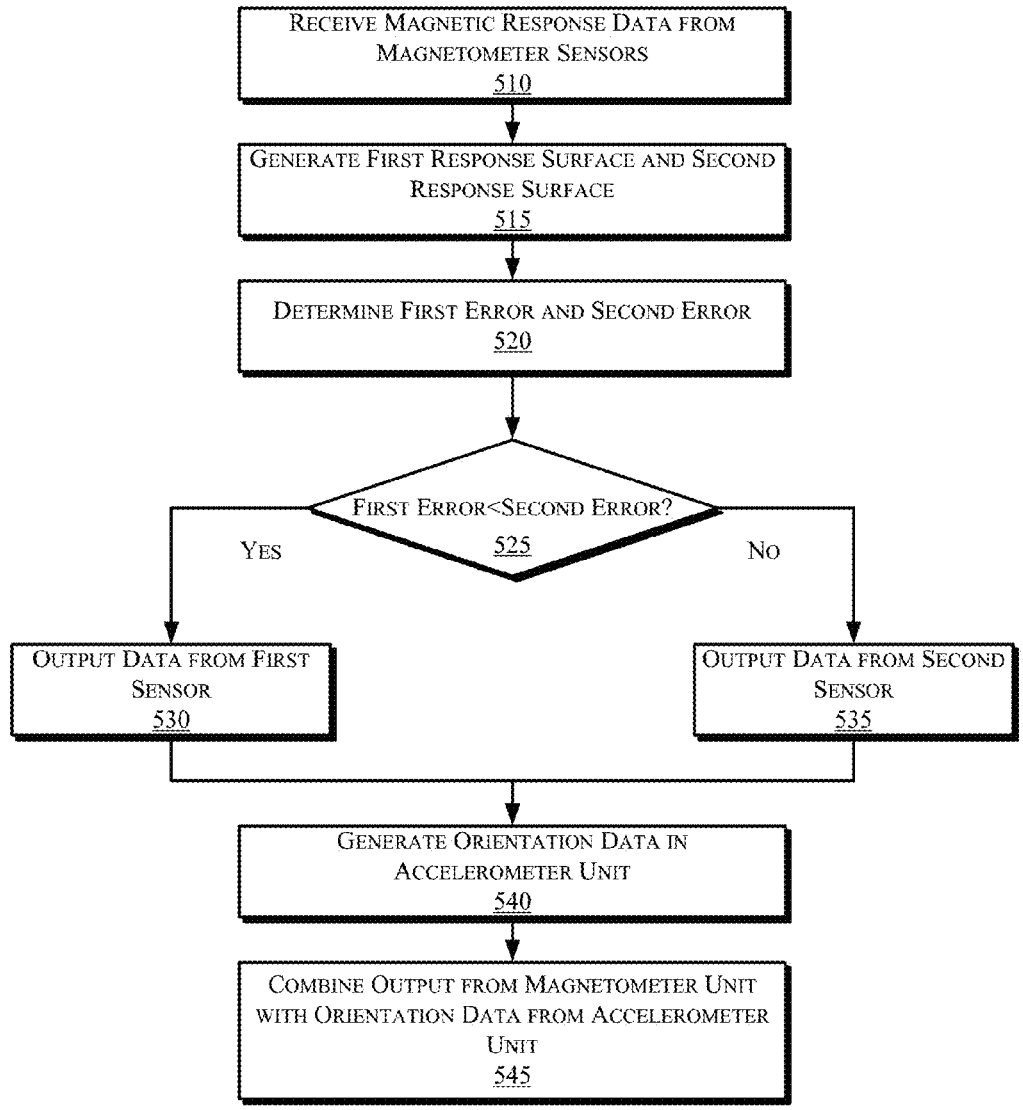

VIRTUAL GYROSCOPE USING DUAL MAGNETOMETERS FOR ELECTRONIC DEVICES

RELATED APPLICATIONS

None.

BACKGROUND

The subject matter described herein relates generally to the field of electronic devices and more particularly to a magnetometer unit for electronic devices.

Electronic devices such as laptop computers, tablet computing devices, electronic readers, mobile phones, and the like may include sensors such as magnetic sensors that facilitate determining a location/position and/or orientation of the electronic device. Techniques which enable an electronic device to process inputs from such sensors to approximate a location/position and/or orientation (i.e., attitude) of the electronic device may find utility.

BRIEF DESCRIPTION OF THE DRAWINGS

The detailed description is described with reference to the accompanying figures.

FIG. 1 is a schematic illustration of an electronic device which may be adapted to include a magnetometer unit in accordance with some examples.

FIGS. 4-5 are flowcharts illustrating operations in a method to implement a magnetometer unit in accordance with some examples.

DETAILED DESCRIPTION

Described herein are exemplary systems and methods to implement a magnetometer unit in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Figure 3A:
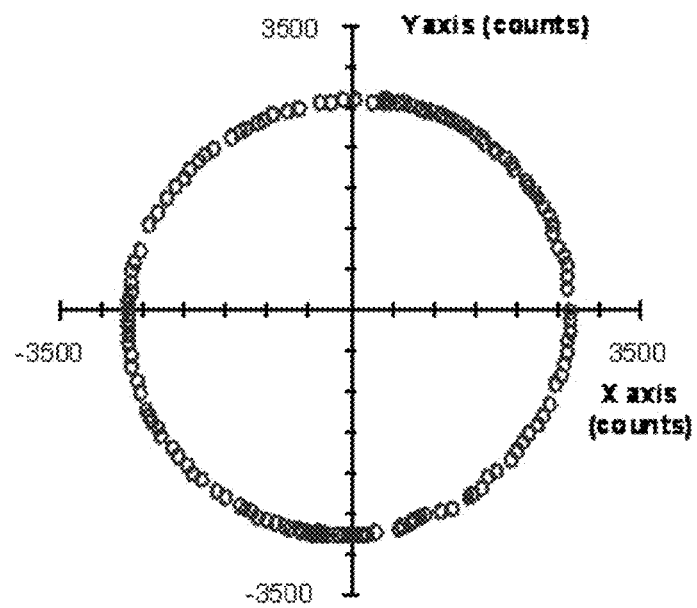
FIGS. 3A-3F are graphs illustrating magnetic response surfaces for a magnetometer unit in accordance with some examples.

As described above, it may be useful to provide electronic devices with a magnetometer unit which may be used to implement techniques to determine a location/position and/or orientation of the electronic device. However, magnetic interference in the ambient environment and/or magnetic interference generated by other components or structures of an electronic device may impede an accurate heading determination from magnetic sensors of magnetometer unit. A perfect magnetic sensor would generate a response surface with a response surface in the shape of a circle with a centroid approximately at the origin (0,0) as shown in FIG. 3A when rotated about a magnetic sensor's z-axis in a constant magnetic field. One skilled in the art will recognize that a multi-axis rotation of a magnetic sensor would generate a response surface having in the shape of a three-dimensional sphere with a centroid approximately at the origin (0,0,0).

The field measured by a magnetic sensor in a platform, with negligible distortion with respect to rotation, can be expressed as a vector addition of three magnetic fields and the respective coordinate systems: magnetic field induced by the platform, the earth's magnetic field, and any contribution from magnetic sources external to platform. This can be stated as:

$$B_{sensor}\begin{bmatrix}\hat{x}\\\hat{y}\\\hat{z}\end{bmatrix} = B_{platform}\begin{bmatrix}\hat{x}\\\hat{y}\\\hat{z}\end{bmatrix} + \left(B_{earth}\begin{bmatrix}x\\y\\z\end{bmatrix} + B_{ambient}\begin{bmatrix}x\\y\\z\end{bmatrix}\right)R(\phi,\theta,\varphi)$$

$$\begin{bmatrix}\hat{x}\\\hat{y}\\\hat{z}\end{bmatrix} = \text{platform/sensor coordinates}; \begin{bmatrix}x\\y\\z\end{bmatrix} = \text{world coordinates}$$

$R(\phi,\theta,\varphi) \equiv$ Rotation Translation matrix of sensor and world coordinates The absolute value of each vector is a function of both the strength of magnetic sources and proximity to boundaries in both the world and platform coordinate systems.

The true heading of the platform can be determined with the following equation.

$$\text{Magnetic North} \equiv \arctan\left(\frac{B_{earth}y}{B_{earth}x}\right);$$

Figure 3B:
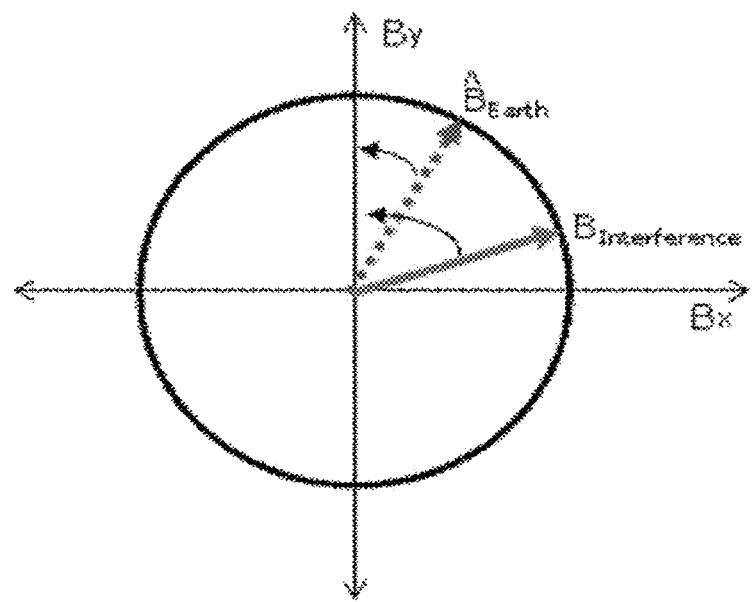

Accurate heading determination relies on complex tracking algorithms to maintain the ideal centroid in the presence of platform and environmental magnetic interference. FIG. 3B illustrates that relative sensor rotation coordinates can still be obtained even with magnetic interference but true heading (i.e., Magnetic North) cannot be determined.

Figure 3C:
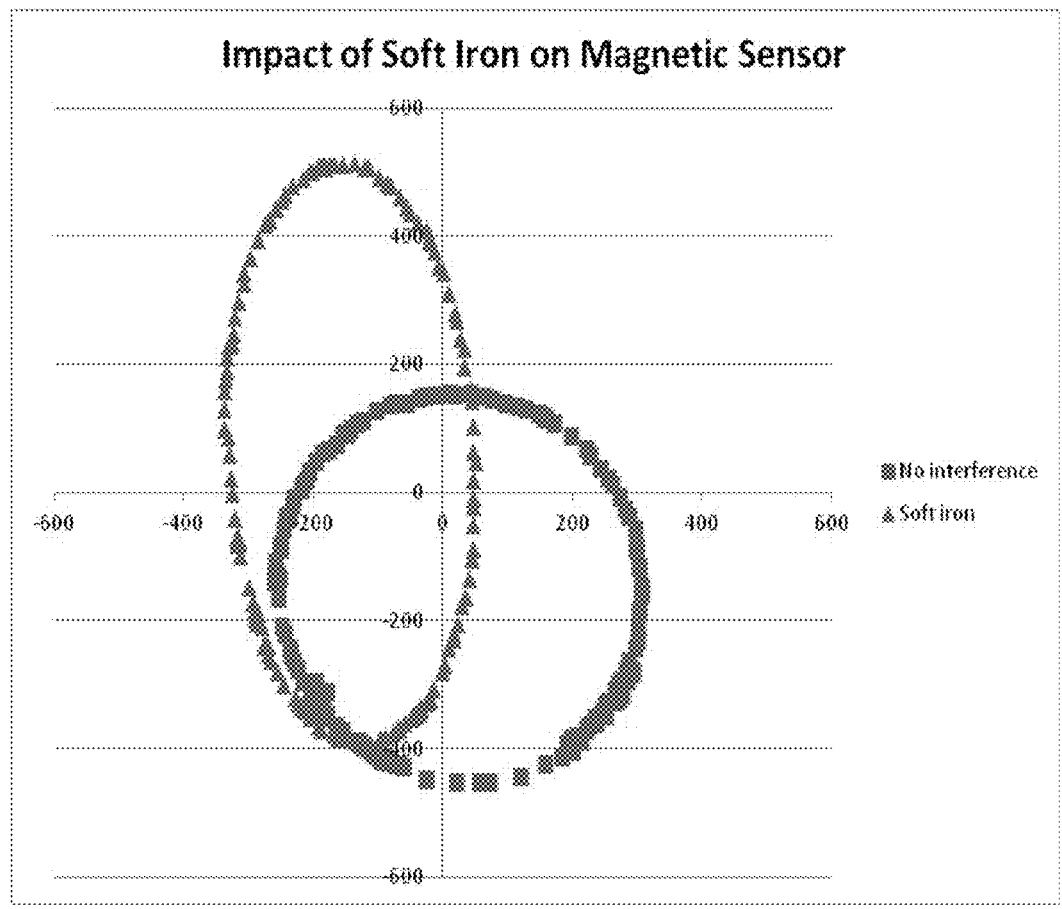

Under certain conditions, the heading accuracy will diminish further as the centroid will be subjected to shifts and distortions due to interference from objects. FIG. 3C is a graph which illustrates a distortion in the response surface induced by soft iron in close physical proximity with a magnetic sensor. A distortion of the magnitude depicted in FIG. 3C may require an electronic device to activate a second sensor that is not influenced by magnetic fields (e.g., a gyroscope) to verify that a valid direction change did occur. However, sensors such as gyroscope sensors consume significantly more power (e.g., 10×-100×) than a magnetic sensor, resulting in significant power drain from the electronic device. Thus, it may be useful to provide alternate techniques to determine a position and/or orientation of an electronic device.

The subject matter described herein addresses these and other issues by providing a virtual gyroscope for an electronic device. In some examples, the virtual gyroscope comprises a magnetometer unit which comprises logic to receive first magnetic response data from a first magnetic sensor and second magnetic response data from a second magnetic sensor displaced from the first magnetic sensor, generate a first corrected response surface from the first magnetic response data and a second corrected response surface from the second magnetic response data, and generate a composite response surface representation from the first response data and the second magnetic response data. The virtual gyroscope further comprises an accelerometer unit comprising logic to generate orientation data for the electronic device, and a combiner unit comprising logic to combine one of the first magnetic response data or the second magnetic response data with the orientation data from the accelerometer.

Additional features and operating characteristics of the magnetometer unit and of electronic devices are described below with reference to FIGS. 1-10.

FIG. 1 is a schematic illustration of an electronic device 100 which may be adapted to include a virtual gyroscope in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may be logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms.

In the embodiment depicted in FIG. 1 the controller 170 comprises a processor 172, a memory module 174, a virtual gyroscope 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the virtual gyroscope 176 may reside in the memory 140 of electronic device 100 and may be executable on one or more of the processors 122.

Figure 2A:
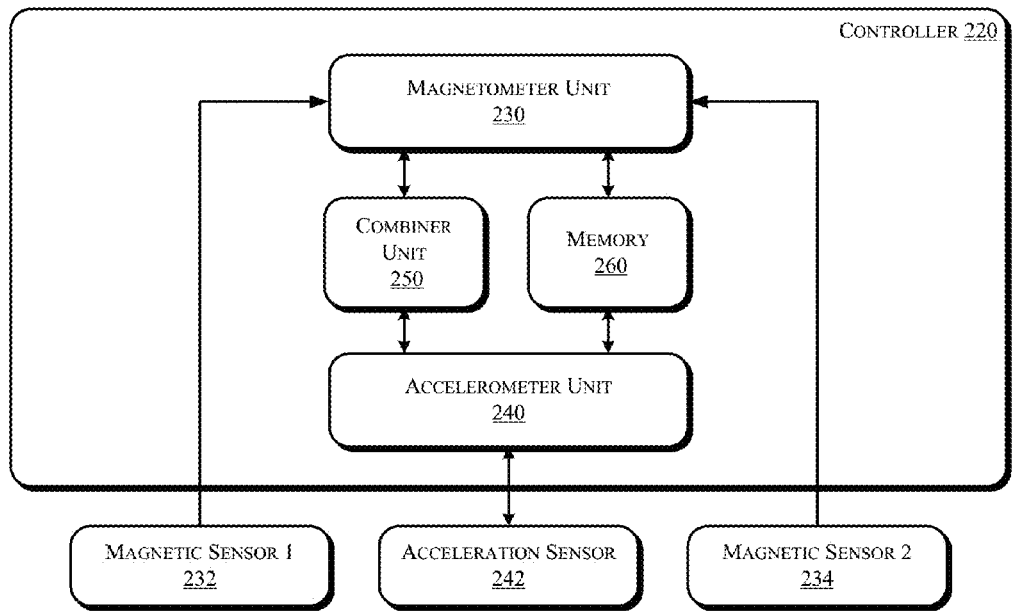
FIG. 2A is a high-level schematic illustration of an exemplary architecture to implement a magnetometer unit in accordance with some examples.

In some examples the virtual gyroscope 176 interacts with one or more other components of the electronic device 100 to approximate a location/position and/or orientation of the electronic device. FIG. 2A is a high-level schematic illustration of an exemplary architecture to implement a virtual gyroscope 176 in electronic devices. Referring to FIG. 2, a controller 220 may be embodied as general purpose processor 122 or as a low-power controller such as controllers 170. Controller 220 may comprise a magnetometer unit 230, an accelerometer 240, a combiner unit 250, and local memory 260. As described above, in some examples the magnetometer unit 230, accelerometer unit 240, combiner unit 250 may be implemented as logic instructions executable on controller 220, e.g., as software or firmware, or may be reduced to hardwired logic circuits. Local memory 260 may be implemented using volatile and/or non-volatile memory.

Controller 220 may be communicatively coupled to one or more local devices input/output (I/O) devices which provide signals that indicate whether an electronic device is in motion or other environmental conditions. For example, the magnetometer unit 230 in controller 220 may be coupled to a first magnetic sensor 232 and a second magnetic sensor 234. Similarly, accelerometer unit 240 may be coupled to an acceleration sensor 242.

Figure 2B:
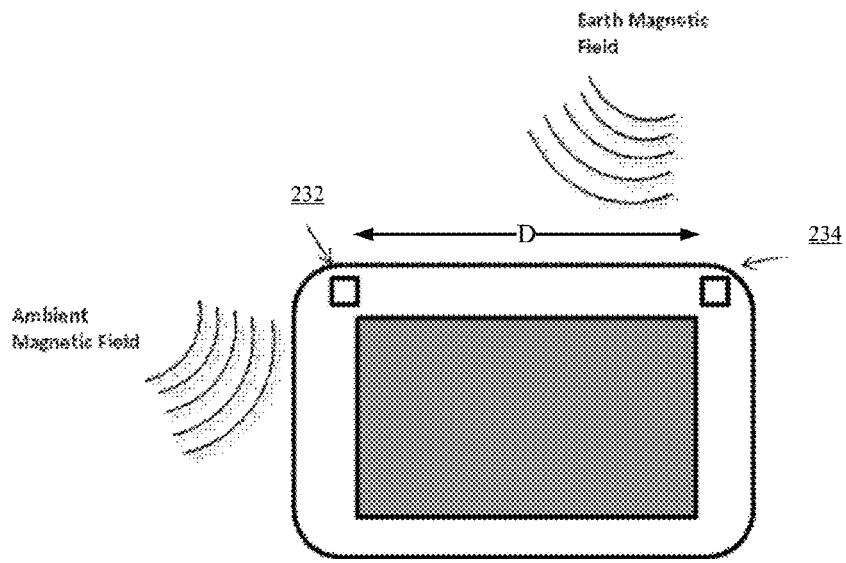
FIG. 2B is a schematic illustration of an electronic device adapted to include a magnetometer unit in accordance with some examples.

FIG. 2B is a schematic illustration of an electronic device adapted to include a virtual gyroscope in accordance with some examples. Referring to FIG. 2B, in some embodiments the first magnetic sensor 232 and the second magnetic sensor 234 may be separated by a distance, D. One skilled in the art will recognize that electronic device 100 may comprise more than two magnetic sensors.

Having described various structures of a system to implement a virtual gyroscope in electronic devices, operating aspects of a system will be explained with reference to FIGS. 4-5, which are flowcharts illustrating operations in methods to implement a virtual gyroscope in accordance with some examples. The operations depicted in the flowcharts of FIGS. 4-5 may be implemented by the virtual gyroscope 176, alone or in combination with other component of electronic device 100.

In some examples the magnetometer unit 230 implements a calibration process during device setup or on a periodic basis. Referring to FIG. 4, at operation 410 the magnetometer unit 230 receives magnetic response data from two or more magnetic sensors, e.g., sensors 232, 234. In some embodiments the electronic device may be mounted on a platform and rotated about one or more axes. The magnetometer unit 230 then receives magnetic response data generated by the magnetic sensors 232, 234. At operation 415 the magnetometer unit 230 generates a composite response surface from the magnetic response data received in operation 410. By way of example, FIG. 3D is a graphic illustration of magnetic response surfaces generated by the first magnetic sensor 232 and the second magnetic sensor 234.

Figure 3D:
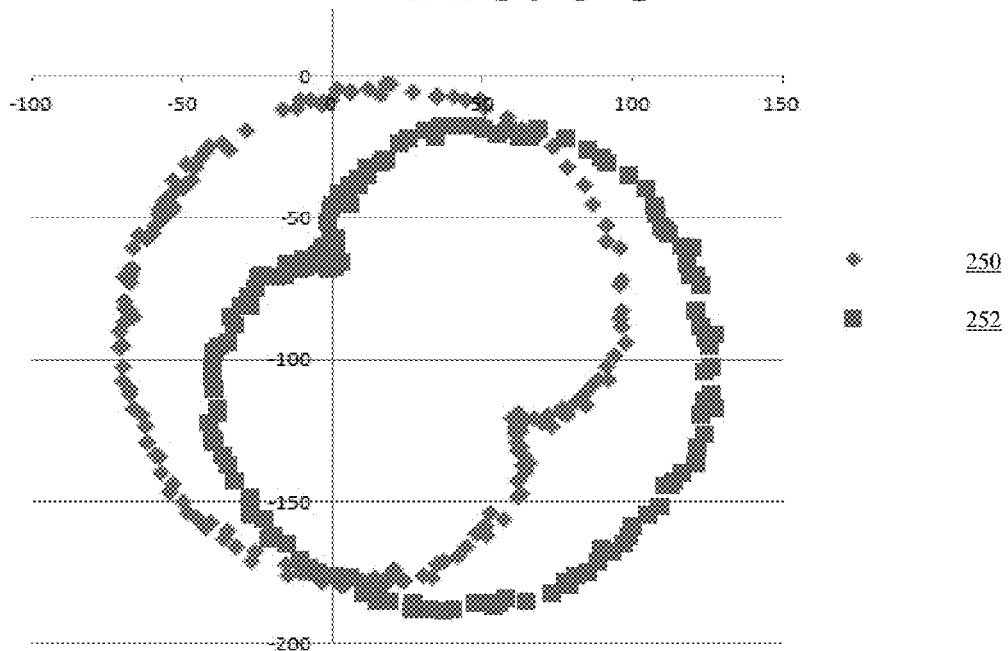
Figure 3E:
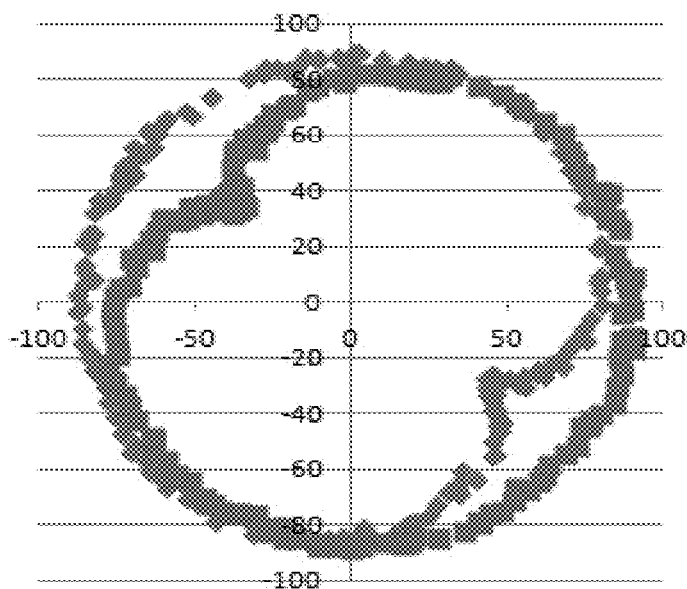

In the example depicted in FIG. 3D, the first sensor 232 and the second sensor 234 exhibit different offsets resulting from their respective positions within the device, relative to an external source of magnetic interference, e.g., hard iron. As one sensor was rotated closer to a hard iron interference source, the distance between the interference source and the second sensor was increasing as the sensors were on opposite sides of the device. As each sensor became closer to the interference source, its response surface departs from the typical circular shape and follows a rosette path. Heading errors associated with using a single sensors output would increase as it came closer to the interference source. FIG. 3E illustrates that by using two sensors, it is possible to obtain a composite response surface that is fairly circular and minimizes, or at least reduces, errors in the calculated orientation.

Figure 3F:
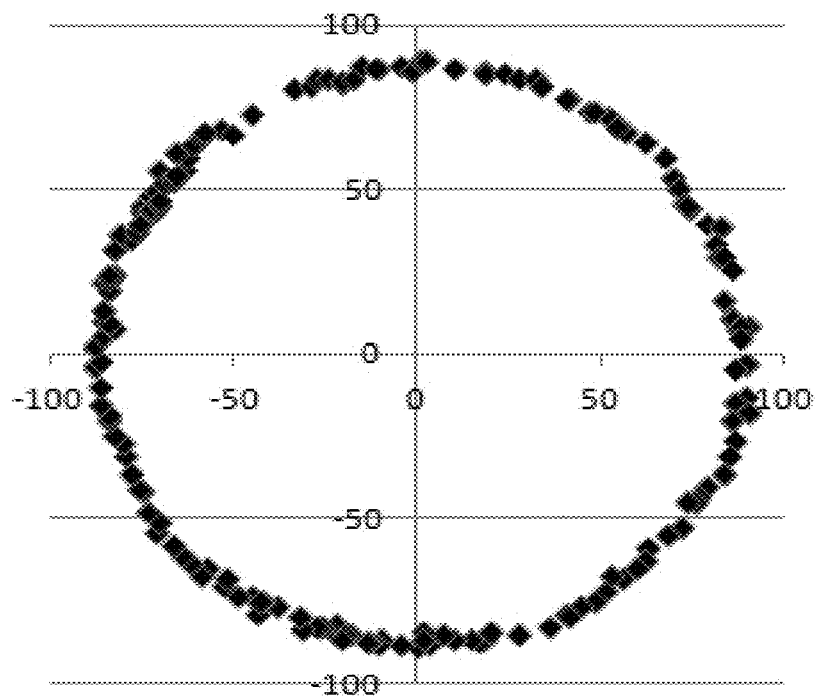

At operation 415 a composite response surface is generated. FIG. 3F illustrates one example of a composite surface which may be determined by using the bounding values of the corrected response surfaces to obtain an ideal resultant. At operation 420 the data that defines the composite surface is stored in a memory.

When the electronic device is in use, data received from the magnetic sensors may be used to generate response surfaces which may be compared to the composite surface generated in operation 420 to determine which sensor is most likely generating an accurate heading. Referring to FIG. 5, at operation 510 magnetic response data from the first magnetic sensor 232 and the second magnetic sensor 234 is received in the virtual gyroscope 230. At operation 515 the virtual gyroscope generates a first response surface using the data from the first magnetic sensor 232 and a second response surface using the data from the second magnetic sensor 234.

At operation 520 a first error and a second error are determined by comparing the respective first and second response surfaces to the composite surface generated in operation 415. The first error may be determined by subtracting the data points associated with the first response surface from the corresponding data points associated with the composite response surface. Similarly, the second error may be determined by subtracting the data points associated with the second response surface from the corresponding data points associated with the composite response surface.

If at operation 525 the first error is less than the second then control passes to operation 530 and the virtual gyroscope 230 outputs data from the first magnetic sensor 232. By contrast, if at operation 525 the first error is not less than the second then control passes to operation 535 and the virtual gyroscope 230 outputs data from the second magnetic sensor 234.

At operation 540 the accelerometer unit 240 generates orientation data for an electronic device such as electronic device 100 into which the virtual gyroscope 176 may be incorporated. By way of example, the accelerometer unit 240 may generated pitch and roll data for the electronic device 100.

At operation 545 the output from the magnetometer unit 230 is combined with orientation data from the accelerometer unit 240, e.g., in the combiner unit 250. In some examples the output from the magnetometer unit 230 may be transformed by a rotation matrix before it is input to the combiner unit 250.

FIG. 5 is a series of graphs comparing virtual gyroscope output with an output of a real gyroscope in accordance with some examples.

Figure 6:
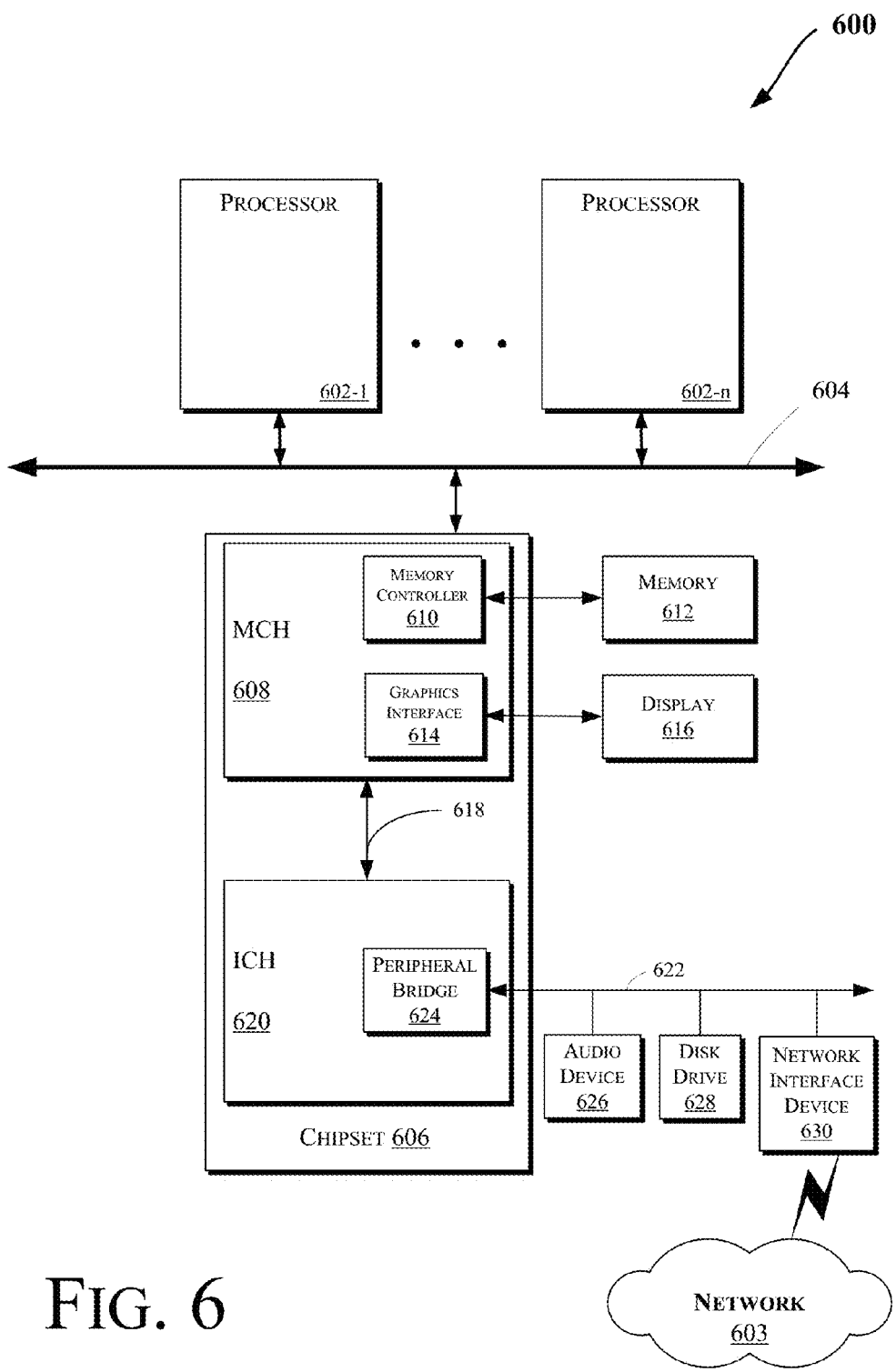
FIGS. 6-10 are schematic illustrations of electronic devices which may be adapted to implement smart frame toggling in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
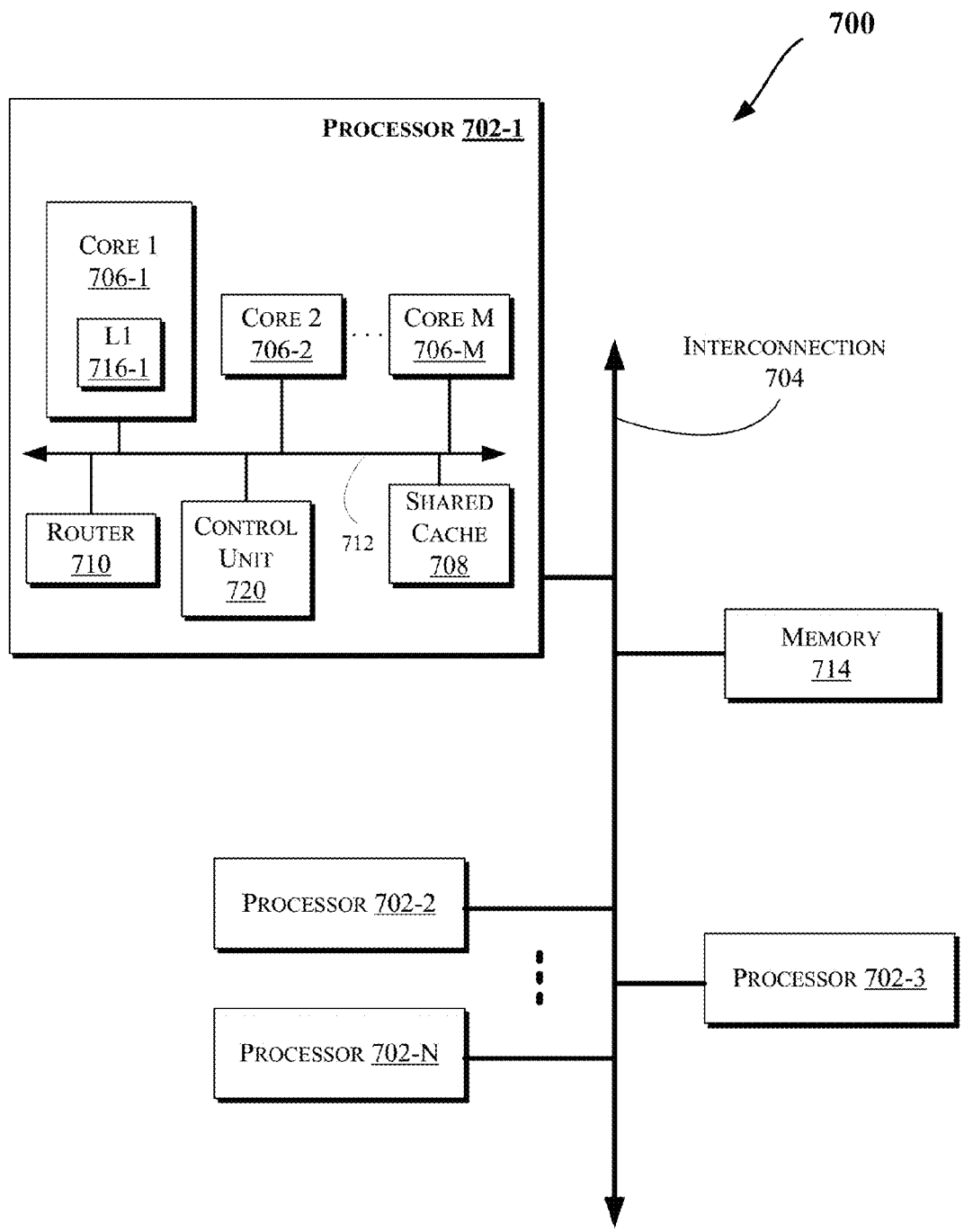

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
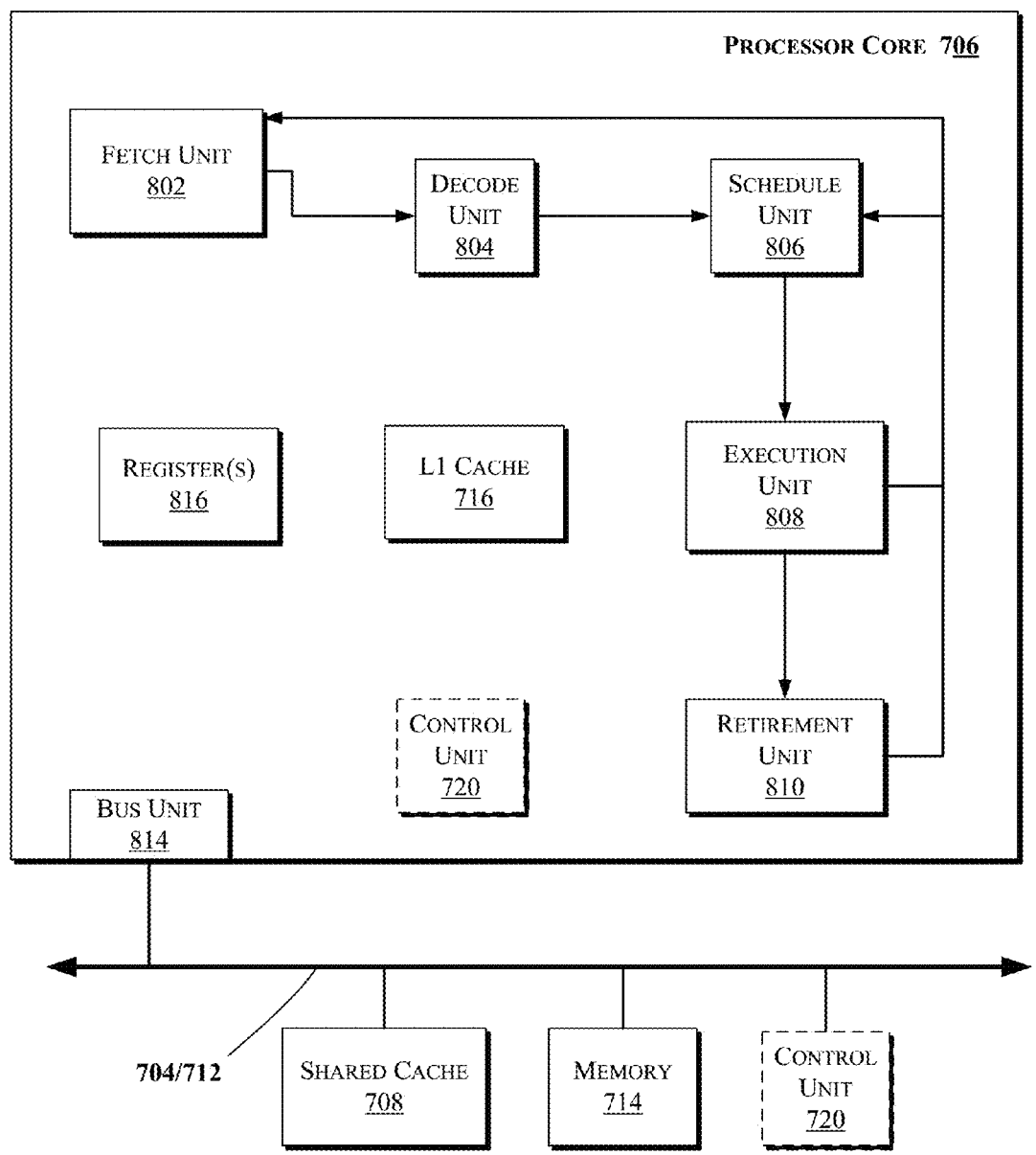

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
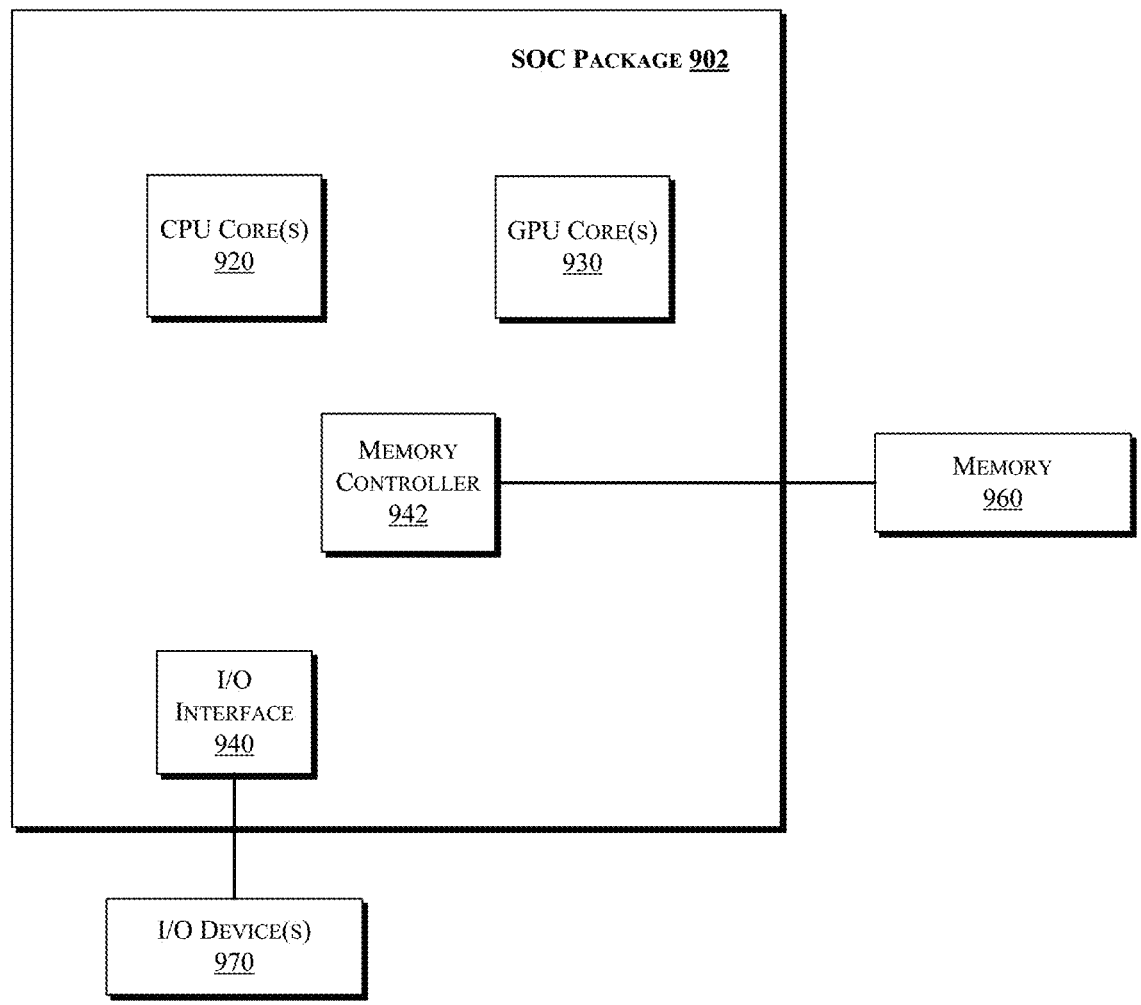

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
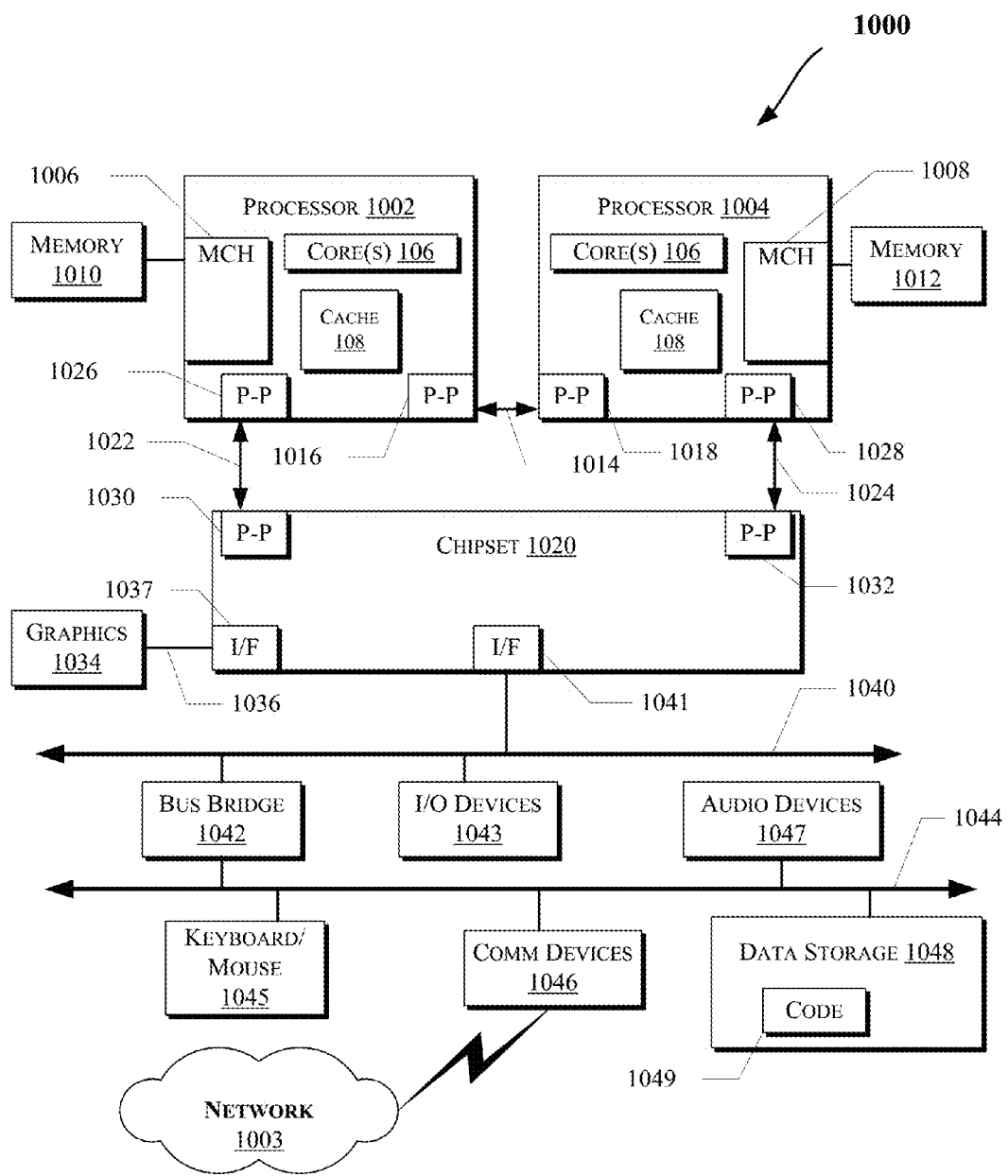

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A virtual gyroscope for an electronic device, comprising:
   a controller comprising a magnetometer unit comprising logic to:
      receive first magnetic response data from a first magnetic sensor and second magnetic response data from a second magnetic sensor displaced from the first magnetic sensor;
      generate a first response surface from the first magnetic response data and a second response surface from the second magnetic response data;
      generate a composite response surface representation from the first magnetic response data and the second magnetic response data;
      compare the first response surface and the second response surface to the composite response surface; and
      select one of the first magnetic response data or the second magnetic response data as an output of the magnetometer unit; and
   an accelerometer unit comprising logic, at least partially including hardware logic, to:
      generate orientation data for the electronic device; and
   a combiner unit comprising logic to:
      combine one of the first magnetic response data or the second magnetic response data with the orientation data from the accelerometer unit.

2. The virtual gyroscope of claim 1, wherein the magnetometer unit further comprises logic to:
   output one of the first magnetic response data or the second magnetic response data.

3. An electronic device, comprising:
   at least one electronic component; and
   a controller comprising a magnetometer unit comprising logic to:
      receive first magnetic response data from a first magnetic sensor and second magnetic response data from a second magnetic sensor displaced from the first magnetic sensor;
      generate a first corrected response surface from the first magnetic response data and a second corrected response surface from the second magnetic response data;
      generate a composite response surface representation from the first magnetic response data and the second magnetic response data;
      select one of the first magnetic response data or the second magnetic response data as an output of the magnetometer unit; and
      compare the first response surface and the second response surface to the composite response surface;

an accelerometer unit comprising logic, at least partially including hardware logic, to:
    generate orientation data for the electronic device; and
a combiner unit comprising logic to:
    combine one of the first magnetic response data or the second magnetic response data with the orientation data from the accelerometer unit.

4. The electronic device of claim 3, wherein the magnetometer unit further comprises logic to:
    output one of the first magnetic response data or the second magnetic response data.

5. A non-transitory computer readable medium comprising logic instructions which, when executed by a controller, configure the controller to:
    receive first magnetic response data from a first magnetic sensor and second magnetic response data from a second magnetic sensor displaced from the first magnetic sensor;
    generate a first corrected response surface from the first magnetic response data and a second corrected response surface from the second magnetic response data;
    generate a composite response surface representation from the first magnetic response data and the second magnetic response data;
    select one of the first magnetic response data or the second magnetic response data as an output of the magnetometer unit; and
    compare the first response surface and the second response surface to the composite response surface;
    generate orientation data for the electronic device; and
    combine one of the first magnetic response data or the second magnetic response data with the orientation data from the accelerometer unit.

6. The non-transitory computer readable medium of claim 5, wherein the magnetometer unit further comprises logic, at least partially including hardware logic, configured to:
    output one of the first magnetic response data or the second magnetic response data.

7. A method to determine a position of an electronic device, comprising:
    receiving first magnetic response data from a first magnetic sensor and second magnetic response data from a second magnetic sensor displaced from the first magnetic sensor;
    generating a first corrected response surface from the first magnetic response data and a second corrected response surface from the second magnetic response data;
    generating a composite response surface representation from the first magnetic response data and the second magnetic response data;
    selecting one of the first magnetic response data or the second magnetic response data as an output of the magnetometer unit;
    comparing the first response surface and the second response surface to the composite response surface
    generating orientation data for the electronic device; and
    combining one of the first magnetic response data or the second magnetic response data with the orientation data from the accelerometer unit.

8. The method of claim 7, wherein the magnetometer unit further comprises logic, at least partially including hardware logic, configured to:
    output one of the first magnetic response data or the second magnetic response data.

* * * * *